United States Patent [19]
Bona et al.

[11] Patent Number: 5,259,049
[45] Date of Patent: Nov. 2, 1993

[54] SELF-ALIGNED OPTICAL WAVEGUIDE TO LASER STRUCTURE AND METHOD FOR MAKING THE SAME

[75] Inventors: Gian-Luca Bona, Affoltern am Albis; Fritz Gfeller, Rüschlikon; Heinz Jaeckel, Kilchberg; David J. Webb, Rüschlikon, all of Switzerland

[73] Assignee: International Business Machines Corporation, Armonk, N.Y.

[21] Appl. No.: 871,350

[22] Filed: Apr. 21, 1992

[30] Foreign Application Priority Data

Sep. 19, 1991 [EP] European Pat. Off. ........ 91810742.6

[51] Int. Cl.$^5$ ............................................. G02B 6/30
[52] U.S. Cl. ..................................... 385/50; 385/49; 385/51
[58] Field of Search ..................... 385/50, 48, 49, 51, 385/52

[56] References Cited

U.S. PATENT DOCUMENTS

| 3,774,987 | 11/1973 | Boivin | 385/50 X |
| 4,744,619 | 5/1988 | Cameron | 385/50 X |
| 5,073,002 | 12/1991 | Hockaday | 385/50 X |

FOREIGN PATENT DOCUMENTS

0402556 12/1990 European Pat. Off. .
2086881 4/1987 Japan .

OTHER PUBLICATIONS

"Full-Wafter Technology—A New Approach to Large-Scale Laser Fabrication and Integration", by P. Vettiger, et al., IEEE Journal Quantum Electron., vol. 27, Jun. 1991, pp. 1319-1331.
"Adjusting the Height of Heat Sink Heterojunction Lasers to Meet up with Optical Couplers and Waveguides", by G. L. Hutchins, IBM Technical Disclosure bulletin, vol. 17, No. 10, Mar. 1975, p. 3134.
"Offset Laser to Groove Waveguide Coupler", by L. D. Comerford, et al., IBM Technical Disclosure Bulletin, vol. 20, No. 4, Sep. 1977, pp. 1606-1608.
Electronics Letters, vol. 26, No. 2, Jan. 18, 1990, pp. 142-143, "High Performance Buried Ridge DFB Lasers Monolithically Integrated with Butt Coupled Strip Loaded Passive Waveguides for OEIC".
"Laser Print Head Employing a Plurality of Lasers per Channel", by J. D. Crow, IBM Technical Disclosure Bulletin, vol. 20, No. 6, Nov. 1977, pp. 2443-2444.
"Interconnection of Optical Fibers to Plan Optical Integrated Circuitry" by E. A. Ash, IBM Technical Disclosure Bulletin, vol. 13, No. 9, Feb. 1971, pp. 2925-2926.
A proposal from the book, "Integrated Optics: Theory and Technology", by R. G. Hunsperger, Springer Series in Optical Sciences, Second edition, Springer Verlag. Sep. 1991.

*Primary Examiner*—John D. Lee
*Assistant Examiner*—Phan T. Heartney
*Attorney, Agent, or Firm*—Richard Lau

[57] ABSTRACT

Automatic alignment of an optical waveguide to a ridge waveguide laser is accomplished by transferring the ridge structure of the laser to a substrate by etching a mirror groove. The transferred ridge structure serves as a base for the deposition of waveguide layers. The thickness of the waveguide layers are controlled during the deposition such that the waveguide core is laterally and vertically aligned to the lasing active layer of the laser structure.

7 Claims, 11 Drawing Sheets

FIG. 5
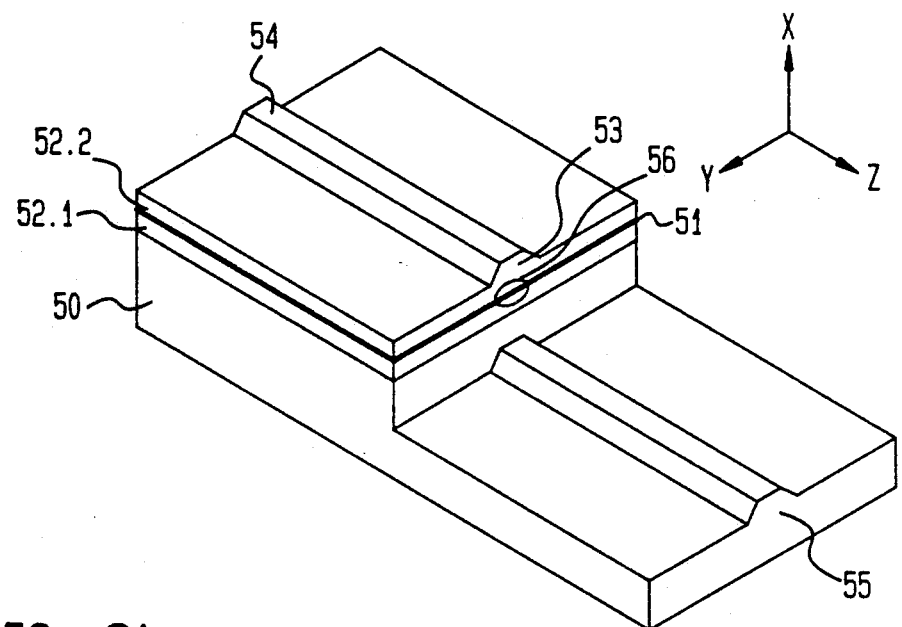
FIG. 6A
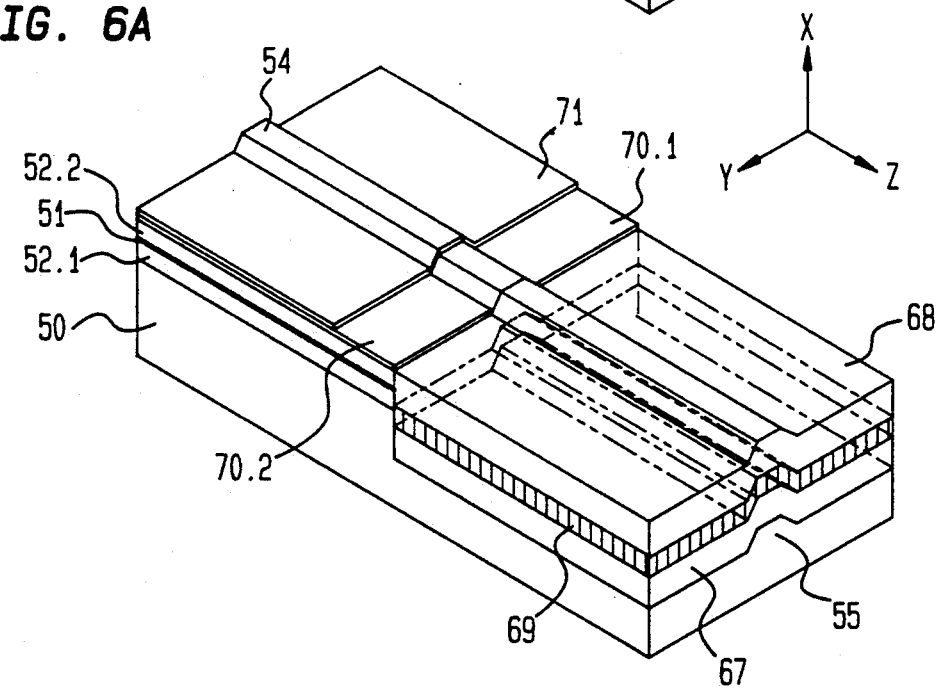
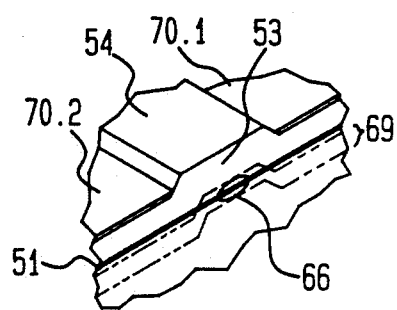
FIG. 6B

SELF-ALIGNED OPTICAL WAVEGUIDE TO LASER STRUCTURE AND METHOD FOR MAKING THE SAME

TECHNICAL FIELD

The present invention relates to opto-electronic devices in which a laser beam emitted by a laser diode is efficiently coupled into a waveguide. The structures as proposed hereinafter comprise waveguides which are horizontally and vertically aligned to the active layer of the laser. In addition to these structures a method for making the same is described.

BACKGROUND OF THE INVENTION

The trend in the field of opto-electronic is towards higher integration, further miniaturization and improved reliability. One important step in this direction is the employment of laser diodes with etched mirror surfaces. The prior known and almost exclusively used cleaved lasers have some drawbacks limiting their utilization in future opto-electronic structures. Cleaved laser bars have to be handled as discrete devices for some of the fabrication steps resulting in inefficient fabrication and testing procedures. In addition, the cleaving technique determines the chip size of a few hundred microns, and therefore makes the integration of additional optical and electronic devices difficult or even impossible.

Fundamental steps towards full wafer processing and therewith higher integration and reduced fabrication costs have been made by the so-called full wafer technology, This technology, which is based on etched laser mirrors, is described in the article "Full wafer technology-A new approach to large-scale laser fabrication and integration", by P. Vettiger et al., IEEE Journal Quantum Electron., Vol. 27, June 1991, pp. 1319-1331.

Full wafer processing (FWP) and full wafer testing (FWT) allow the integration of laser diodes with optical or electrical devices. One important aspect for the integration of opto-electronic devices is their efficient optical coupling to waveguides and other optical components. Most proposals known relate to systems in which cleaved lasers are coupled to optical fibers or waveguides. Therefore the laser and/or the optical waveguide have to be aligned during fabrication or packaging. They can not be made using the same processing steps. Examples are listed below:

In the article "Adjusting the Height of Heat Sink Heterojunction Lasers to Meet up with Optical Couplers and Waveguides", of G. L. Hutchins, IBM Technical Disclosure Bulletin, Vol. 17, No. 10, March 1975, p. 3134, a structure is disclosed in which a discrete cleaved laser is aligned to waveguides by mounting it on top of a mesa heat sink. The height of this mesa is calculated such that the laser is matched to the inputs of the waveguides.

Other methods for coupling beams emitted by a laser into adjacent waveguides is proposed in the article "Offset Laser to Groove Waveguide Coupler", L.D. Comerford et al., IBM Technical Disclosure Bulletin, Vol. 20, No. 4, September 1977, pp. 1601-1608. The different structures shown in this article comprise a GaAs laser or laser array mounted on a silicon substrate adjacent to waveguides. Complicated couplers are employed to couple the light into these waveguides.

For coupling optical fibers to laser diodes other solutions are known in the art. Most of these coupling techniques employ waveguides between the laser source and the fiber. Two examples are described below:

In the article "Laser Print Head Employing a Plurality of Lasers per Channel", of J. D. Crow, IBM Technical Disclosure Bulletin, Vol. 20, No. 6, November 1977, pp. 2443-2444 an optical converter is disclosed which comprises waveguides for feeding laser beams into fibers.

Several proposals are disclosed in the article "Interconnection of Optical Fibers to Planar Optical Integrated Circuitry", of E. A. Ash, IBM Technical Disclosure Bulletin, Vol. 13, No. 9, February 1971, pp. 2925-2926. The alignment of the fibers is complicated and time consuming. The losses at the interfaces between laser/waveguide on one hand and waveguide/fiber on the other hand are high.

Some drawbacks of the known coupling techniques, for coupling between lasers and waveguides or lasers and fibers are:
expensive and time consuming packaging,
complicated alignment,
coupling losses
reduced reliability and performance.

An interesting proposal has been made in the book "Integrated Optics: Theory and Technology", of R. G. Hunsperger, Springer Series in Optical Sciences, Second edition, Springer Verlag, p. 92. There it is described how to butt-couple a waveguide to a laser diode by using piezoelectrically driven micrometer heads, which shows again how complicated the alignment of laser diodes and waveguides is.

SUMMARY OF THE INVENTION

The main object of this invention is to overcome the described drawbacks and deficiencies of known laser to waveguide coupling techniques.

It is another object of this invention to overcome the described drawbacks and deficiencies of known laser to fiber coupling techniques.

A further object is to provide a method for the fabrication of structures comprising lasers being well aligned to waveguides or fibers.

Another object is to improve the coupling efficiency between lasers and waveguides or lasers and fibers.

The invention is intended to meet these objectives and to remedy the known deficiencies by providing for a self-aligned optical waveguide to laser structure and method for making same. The invention allows the fabrication of self-aligned laser diode to waveguide transitions such that the laser diode and the waveguide are made using the same mask for the definition of their lateral dimensions. After etching the laser mirrors, the layers of the waveguide are grown on the etched substrate of the laser such that the waveguide core is well matched to the lasing active layer.

BRIEF DESCRIPTION OF THE DRAWINGS

The invention is described in detail below with reference to the following drawings which are not shown in correct scale.

FIG. 5 is a perspective view of a ridge single quantum well (SQW) GRINSCH (Graded-Index Separate Confinement Heterostructure) laser with ridge structure transferred into the substrate during mirror etching.

FIG. 6A is a perspective view of a ridge single quantum well (SQW) GRINSCH laser with external waveguide grown on the ridge structure transferred into the substrate.

FIG. 6B is a schematic cross-sectional perspective view of FIG. 6A, showing the alignment of the waveguide core to the light mode region of the laser.

DETAILED DESCRIPTION OF THE PREFERRED EMBODIMENT

The phenomenon of optical tunneling can be used for efficiently coupling energy from a light source, e.g. a laser diode, to a waveguide or a fiber. Couplers of this type are called directional couplers because the energy is transferred in a coherent fashion so that the direction of propagation is maintained. The principle characteristics of any coupler are its efficiency and its mode selectivity. Coupling efficiency is usually given as the fraction of total power in the optical beam, which is in our cases coupled from the laser into the waveguide or fiber. The efficiency is defined as given by $$\eta_{Cm} = \frac{\text{power coupled into the } m \text{ th order mode}}{\text{total power in optical beam prior to coupling}} \quad (1)$$

The inventive structures are end-butt couplers where the thickness of the waveguide can be made approximately equal to that of the light emitting laser diode. These end-butt couplers allow coupling efficiency up to nearly 100%. The method of butt coupling is especially useful for coupling a laser diode to a planar waveguide, because efficient coupling of a laser to a waveguide is difficult to achieve by using either prism or grating. The reason for this is that a laser has a relatively uncollimated emitted beam which diverges at a half-angle of typically 10° to 20°. Prism and grating couplers are all very sensitive to the angle of incidence of the light beam resulting in reduced coupling efficiency.

Figure 1:
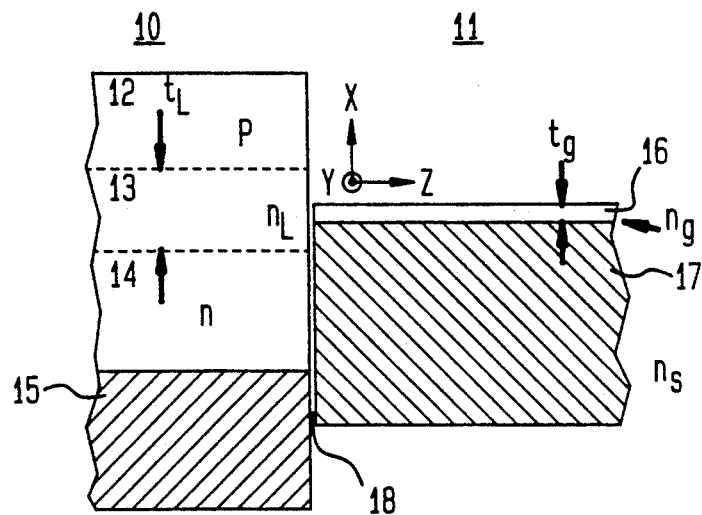
FIG. 1 is a schematic cross-section through a laser diode butt-coupled to a waveguide.

A typical end-butt approach is shown in FIG. 1. The schematically shown laser 10 is mounted on top of a heat sink 15 and comprises an active layer 13 being embedded between an upper and a lower cladding layer 12 and 14 which are n- or p-doped as shown in FIG. 1. The refractive indices of the active layer 13 is $n_L$ and its thickness is $t_L$. A waveguide 11 is end-butt coupled to the laser 10 such that the waveguide core 16 faces to the light emitting active layer 13. The core 16, of thickness $t_g$, is situated on a substrate 17. The refractive index of the waveguide core 16 is $n_g$ and that of the substrate 17 is $n_s$. For the case of a laser diode 10, operating in the fundamental $TE_o$ mode and coupled to the waveguide 11, as illustrated in FIG. 1, the coupling efficiency for the TE modes is given by $$\eta_{Cm} = \frac{64}{(m+1)^2 \pi^2} \frac{n_L n_g}{(n_L + n_g)^2} \cos^2\left(\frac{\pi t_g}{2 t_L}\right) \frac{1}{\left[1 - \left(\frac{t_g}{(m+1)t_L}\right)^2\right]^2} \frac{t_g}{t_L} \cos^2\left(\frac{m\pi}{2}\right) \quad (2)$$

with m = 0, 1, 2, 3, . . . . This expression is based on the assumptions that all waveguide modes are well confined, and that $t_g \leq t_L$. It is interesting to note from the last factor of equation (2) that there is no coupling to odd-order waveguiding modes. The first factor of this equation is just a normalization term, while the second factor arises from reflections at the laser waveguide interface 18. The other terms account for mismatch in the field distributions in the laser 10 and waveguide 11.

Figure 2:
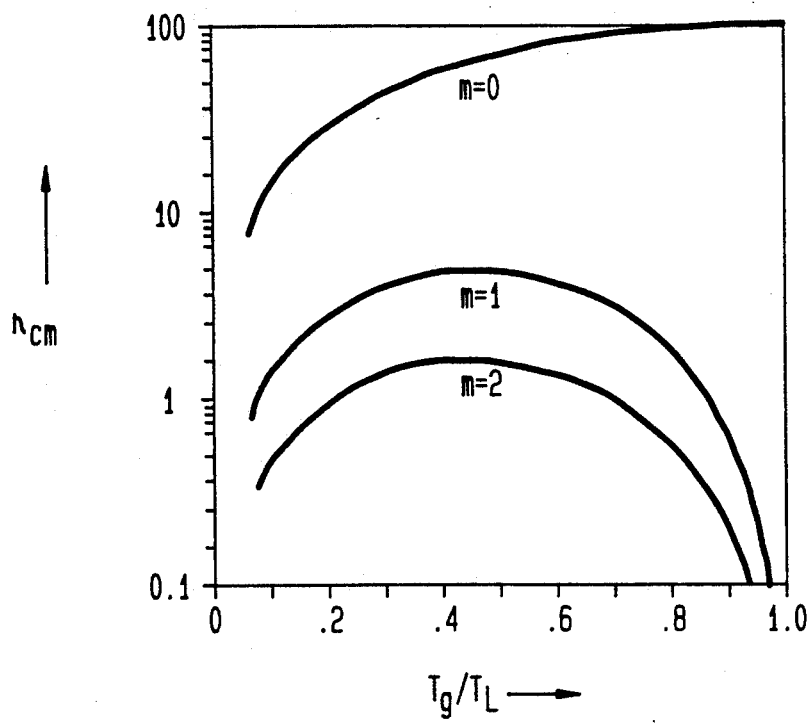
FIG. 2 shows coupling efficiency ($\eta_{cm}$) vs. relative waveguide thickness ($t_g/t_L$) curves with mode number m as parameter.
Figure 3:
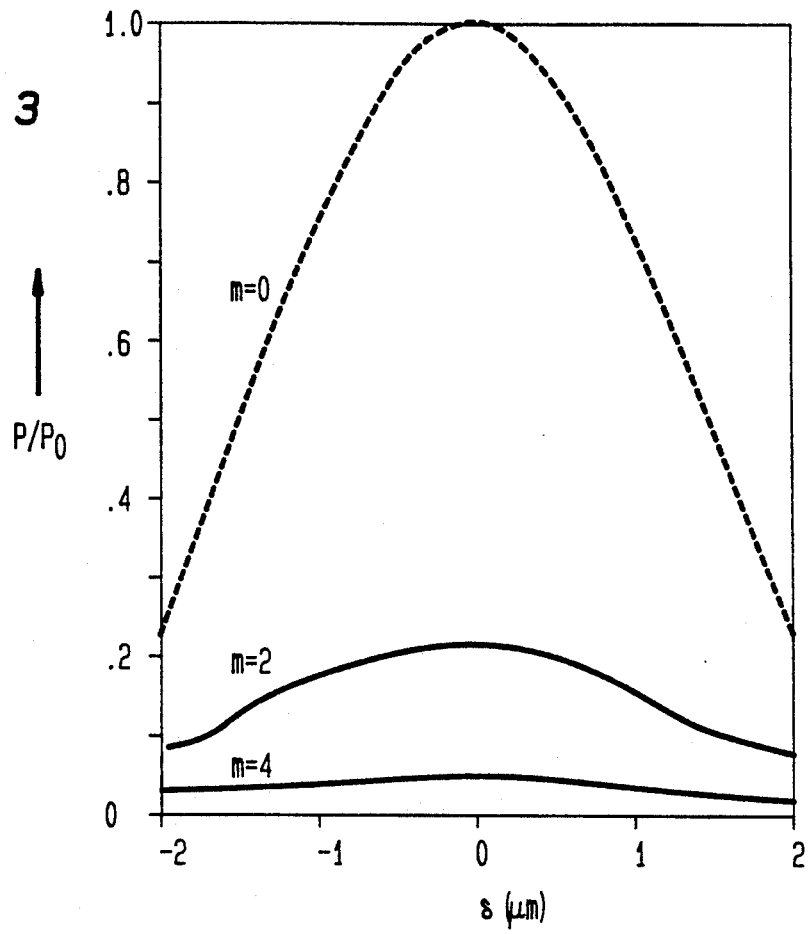
FIG. 3 shows relative coupled power (P/P₀) vs. laser displacement (δ) curves with mode number m as parameter, demonstrating the dependence of coupling efficiency on lateral misalignment.

Calculated curves of $\eta_{Cm}$ as a function of relative waveguide thickness ($t_g/t_L$) are plotted in FIG. 2 for the case of a GaAs laser diode 10 coupled to a $Ta_2O_5$ waveguide 16 on a glass substrate 17, with $n_L = 3,6$, $n_g = 2,0$, and $t_L = 5,8$ μm. For $t_g = t_L$ the efficiency can reach 100% for the lowest order mode (m = 0). The coupling efficiency is very sensitive to misalignment, requiring complicated and time consuming alignment steps for coupling a laser to a waveguide. The coupling efficiency is most sensitive to transverse lateral misalignment in the x direction shown in FIG. 1. A displacement δ of the waveguide 11 relative to the laser 10, as shown in FIG. 3, reduces the coupling efficiency according to the relation $$P/P_0 = \cos^2\left(\frac{\pi \delta}{t_L}\right). \quad (3)$$

where $P_0$ is the coupled power for $\delta = 0$. The equation (3) assumes that $t_g < t_L$ and $\delta \leq (t_L - t_g)/2$. The dashed curve is the calculated $P/P_0$ for the case of $t_L = 5,8$ μm and $t_g = 2,0$ μm.

Figure 4:
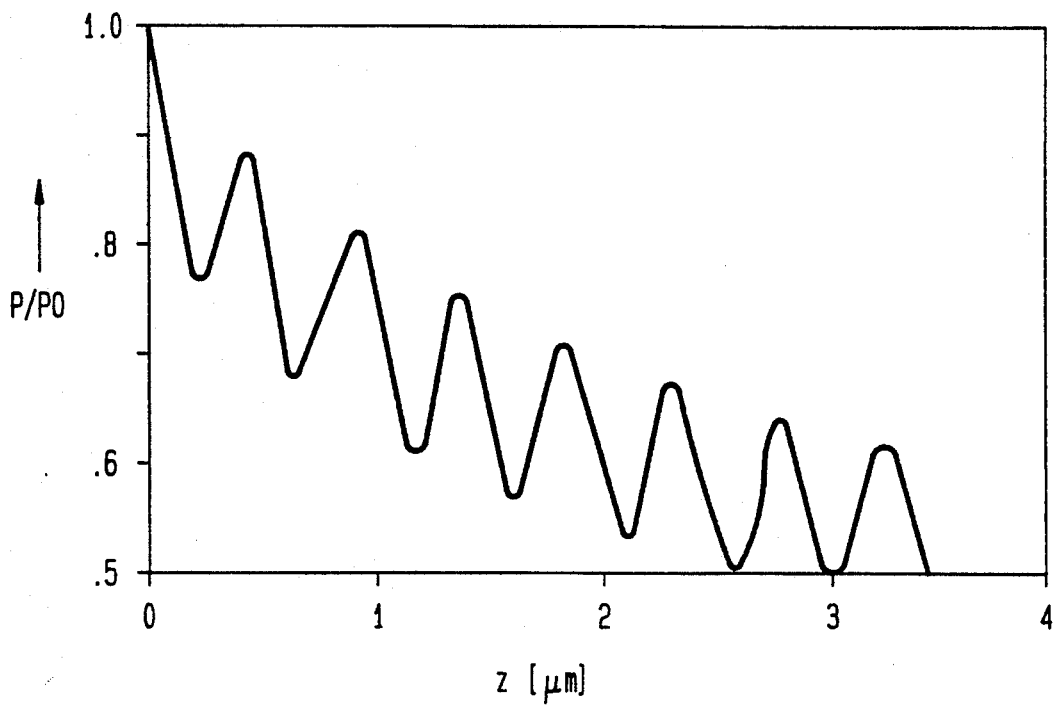
FIG. 4 shows relative coupled power (P/P₀) vs. laser displacement (z) curves with mode number m as parameter, demonstrating the dependence of coupling efficiency on spacing between laser and waveguide.

The spacing 18 between the laser 10 and the waveguide 11 in the z direction is also very critical, and must be controlled to a precision on the order of a wavelength for optimum coupling. FIG. 4 shows the experimentally measured variation of coupled power as a function of z displacement. The oscillatory shape of the curve results from modulation of the effective reflectivity of the laser output face by resonance. End-butt coupling can be a very efficient means for coupling a laser diode to a waveguide, as so far shown. How important precise alignment is can be seen from the given equations and figures. Alignment accuracy in the range of $10^{-6}$ meter and less is required for high efficient laser to waveguide coupling.

The present invention provides a structure where the waveguide core is well aligned to the lasing region of the active layer of a laser diode such that nearly optimum coupling is achieved. The principle of the invention is described in context with FIGS. 5 and 6. FIG. 5 schematically shows the main elements of a single quantum well (SQW) ridge waveguide laser gworn on a GaAs substrate 50. A comparable device is described in more detail in the article "High-Power Ridge-Waveguide AlGaAs GRIN-SCH Laser Diode", of C. Harder et al., Electronics Letters, Vol. 22, No. 20, Sept. 25, 1986, pp. 1081-1082. The schematically shown laser comprises an active GaAs layer 51 forming the quantum well and being embedded between AlGaAs cladding layers 52.1, 52.2. This Figure shows an intermediate state during the fabrication of a ridge waveguide laser with self-aligned waveguide. A similar structure is shown in the European Patent application with publication number 0 402 556. The basic concept of the present invention is to extend the ridge through the region where the mirrors will be etched. This ridge is transferred into the substrate 50 during the dry-etching of the mirror facet 53 for the formation of an external waveguide. The ridge 54 of the laser and the transferred substrate ridge 55 are intrinsically self-aligned so that the external waveguide which is defined laterally by the transferred ridge 55 will automatically be laterally aligned to the laser ridge 54. The vertical alignment, x direction, of the active layer 51 and the external waveguide core can be obtained by the very precise control of the layer thickness of the external waveguide to adjust the active layer 51, i.e. the lasing region 56 of the active layer 51, and the waveguide core 69 to the same vertical height of their optical axis, as illustrated in FIGS. 6A and 6B. The layer thickness can be influenced after etching the laser facet 53 by controlling the deposition of the external waveguide layers 67, 68, 69. These layers are deposited on top of the etched substrate 50 with transferred ridge structure 55, and the waveguide core 69 is embedded between a lower and an upper waveguide cladding layer 67, 68. The waveguide core 69, covering the lower cladding layer 67, is schematically illustrated in FIG. 6 (dashed lines). As shown in FIG. 6B the waveguide core 69 is situated such that the light mode region 66, shown as an ellipse, is directly coupled thereto. The external waveguide can be built by a blanket deposition of different dielectric layers of e.g. $SiO_2$ and $Si_3N_4$. The sequence of the deposited layers 67–69 and their thickness and refractive indices form the vertical optical structure. The etched surfaces on both sides of the laser ridge 54 are covered with insulation layers 70.1 and 70.2. A metallization film 71, deposited on top of the laser structure for use as an electric contact, is schematically indicated.

Problems at the etched mirror, e.g. roughness of this facet, lead to local distortions of the transmitted phases and fields, and it results in asymmetric or even multi-lobed far fields for roughness greater than 30 nm. A proposal is known in the art which allows the fabrication of high quality etched mirrors having a much reduced roughness across the beam cross section. This proposal was first described in the Patent Application with Publication number 0 402 556. In this Patent Application the straight ridge waveguide has been replaced by an etched mirror facet with flared waveguide end section.

Figure 7:
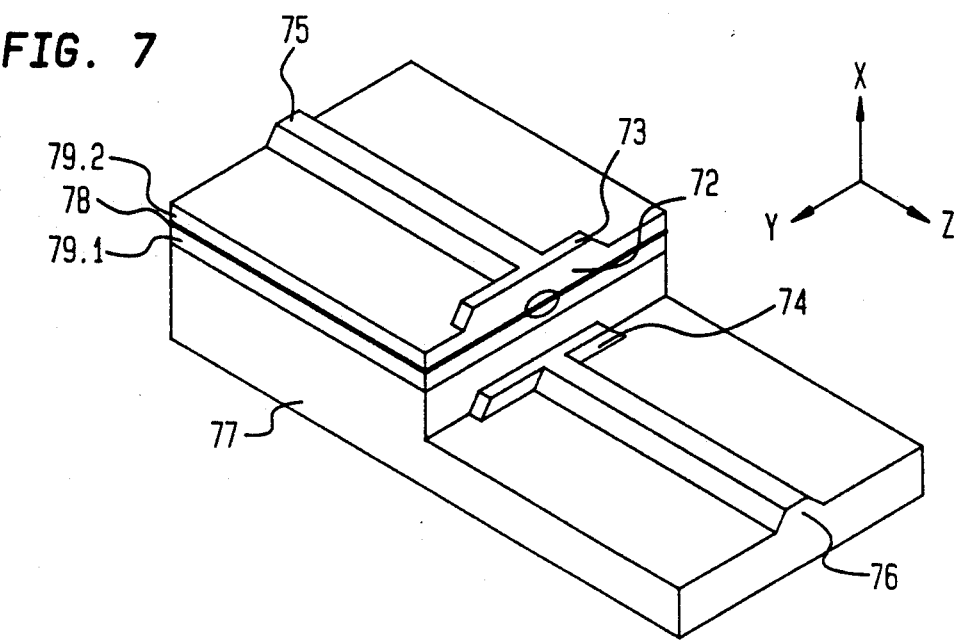
FIG. 7 is a perspective view of a ridge single quantum well (SQW) GRINSCH (Graded-Index Separate Confinement Heterostructure) laser having a flared end section eliminating the curvature in the light mode region, and with ridge structure transferred into the substrate.
Figure 8A:
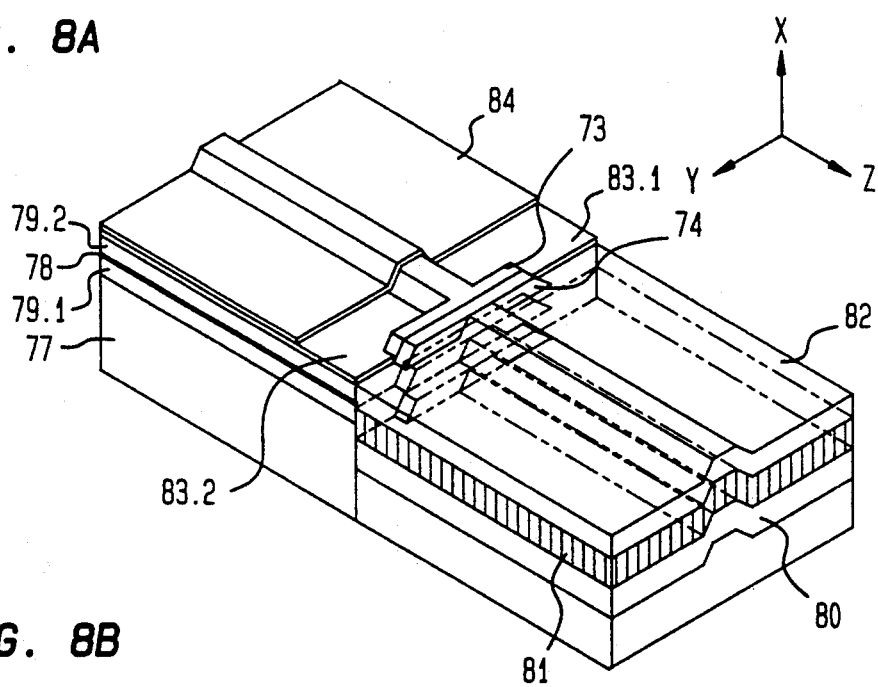
FIG. 8A is a perspective view of a ridge single quantum well (SQW) GRINSCH laser with a flared end section and external waveguide grown on the ridge structure transferred into the substrate.
Figure 8B:
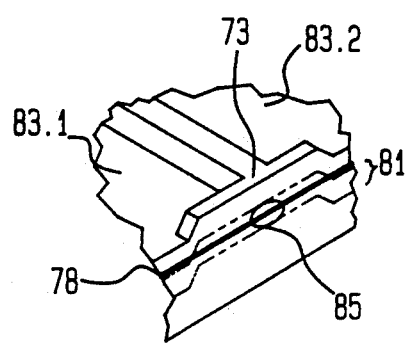
FIG. 8B is a schematic cross-sectional perspective view of FIG. 8A, showing the alignment of the waveguide core to the light mode region of the laser.

Laser diodes with flared waveguide end section can be easily coupled to a waveguide using the inventive method for self-aligned laser to waveguide coupling. A structure with flared end sections 73, 74 is shown in FIGS. 7 and 8. The description of this structure is similar to the one of the structure without flared end section as shown in FIGS. 5 and 6. The shown SQW GRINSCH laser comprises an active layer 78 forming the quantum well, being embedded between two cladding layers 79.1, 79.2 and situated on top of a substrate 77. The laser ridge 75 is widened at its end near the mirror facet 72, forming the flared section 73. The width of this end section 73 is wider than the lateral extension (y direction) of the light mode region 85 of the laser. Thus the regions of roughness do not have an influence on the emitted laser beam. The mirror facet 72 is completely flat in the light mode region. The flared end section 73 of the laser ridge 75 is replicated into the external waveguide as illustrated in FIG. 8. The length of the transferred flared section 74 can be made short, in particular less than 2 μm to minimize the loss of lateral guiding over this distance due to beam diffraction. The layers 80–82 of the external waveguide are grown on top of the transferred ridge structure 76 with flared section 74. Similar to FIG. 6, the laser structure is covered by insulation layers 83.1, 83.2 and a metallization layer 84. The sketch FIG. 8B shows the alignment of the waveguide core 81 (dashed lines) to the light mode region 85 of the active layer 78.

Figure 9:
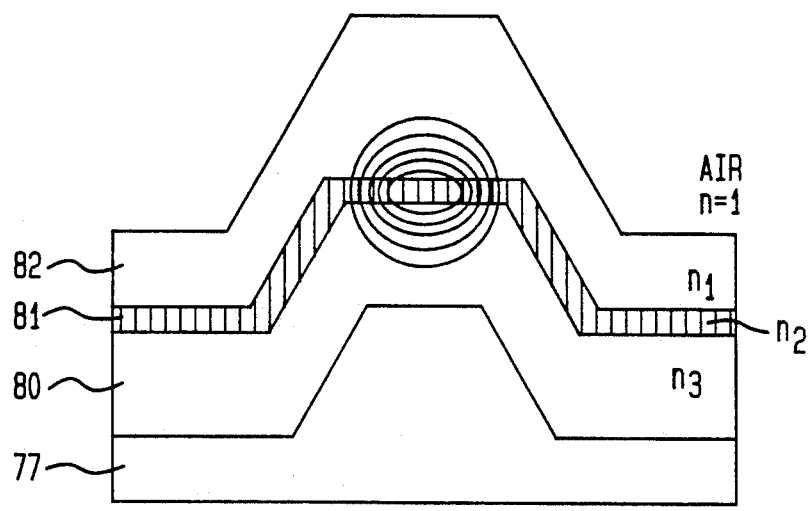
FIG. 9 is a cross-section through the external waveguide of the device shown in FIG. 8, showing the intensity contours of lowest order mode.

A schematic cross-sectional view of the waveguide shown in FIGS. 8, is illustrated in FIG. 9. Intensity contours of the fundamental mode of the external dielectric layer waveguide are shown as ellipsoide concentric regions. The refractive indices $n_1 n_2$, $n_3$ are chosen such that $n_1 \approx n_3$ and $\Delta n_w = n_2 - n_1$ is nearly equal to $\Delta n_L$ of the laser waveguide to achieve nearly the same mode cross-sections in the laser waveguide and the external waveguide. The Full Width at Half Maximum of the calculated laser mode and of the mode sustained by the external passive waveguide can be made the same within 5%. Therefore a good coupling of the laser light into the waveguide is given. Well suited for this application are $SiO_2$ cladding layers 80 and 82 with $n_1 = n_3 = 1,48$ and a $Si_3N_4$: H waveguide core 81 with $n_2 = 1,58$ grown on a GaAs substrate 77.

Figure 10:
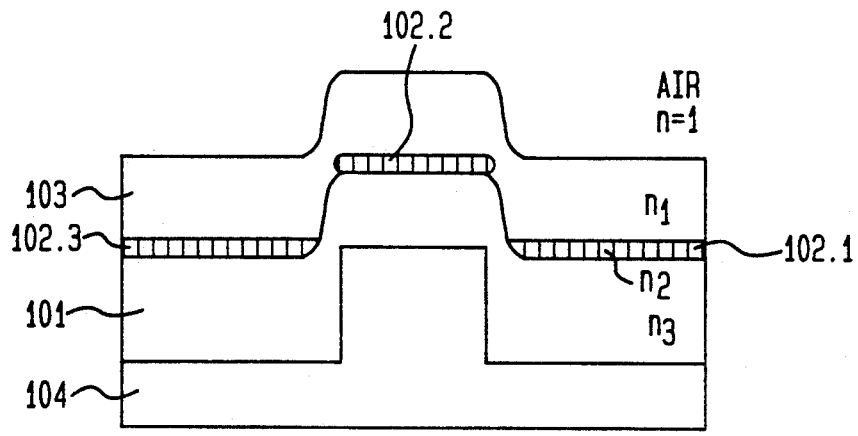
FIG. 10 is a cross-section through a waveguide which can be fabricated on top of a transferred ridge structure with vertical walls for stronger mode confinement as shown in FIGS. 5 or 7.

In both embodiments the lateral mode confinement in the external waveguide is defined by the lateral bending of the layers over the edges of the transferred ridge structure in the substrate. Another extension with improved guiding of the fundamental mode is sketched in FIG. 10. The waveguide layers 101-103 are deposited on top of a substrate 104 with dry etched ridge 100. This allows to production of a waveguide core 102.2, as shown in FIG. 10, which strongly guides the laser mode.

In the following sections and with reference to FIGS. 11A to 11H, the fabrication of a laser structure with self-aligned waveguide, similar to the structures shown in the FIGS. 5 to 9, is described. In the specific embodiments described in conjunction with these Figures, the laser structure comprises a stack of AlGaAs/GaAs layers grown on the (100) surface of an n-type GaAs wafer. The mirror facets are provided by the vertical walls, parallel to the x-y plane, of a groove etched into the stack. By etching this groove, the ridge structure is transferred into the substrate in accordance with the present invention.

Figure 11A:
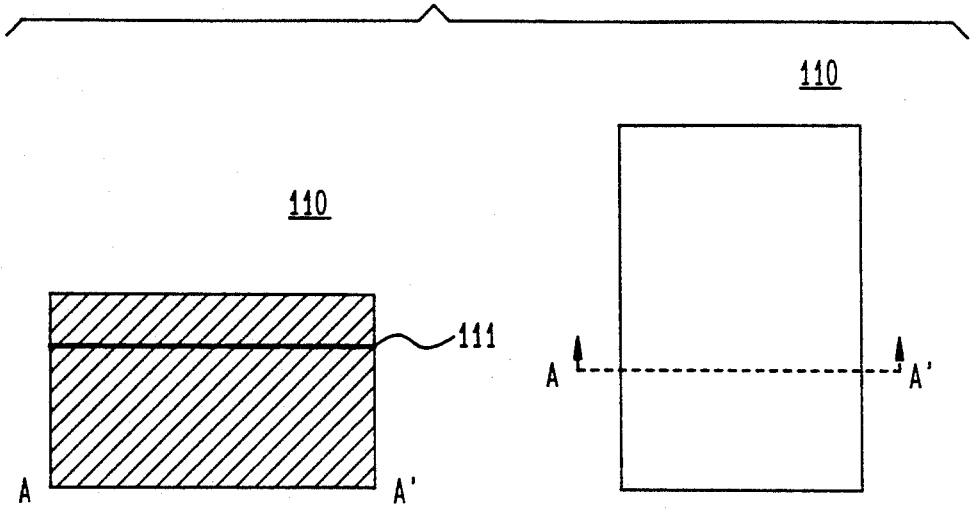
FIG. 11A-11H are schematic and simplified illustrations of the steps of the inventive method for the fabrication of structures with self-aligned laser to waveguide coupling.
Figure 11B:
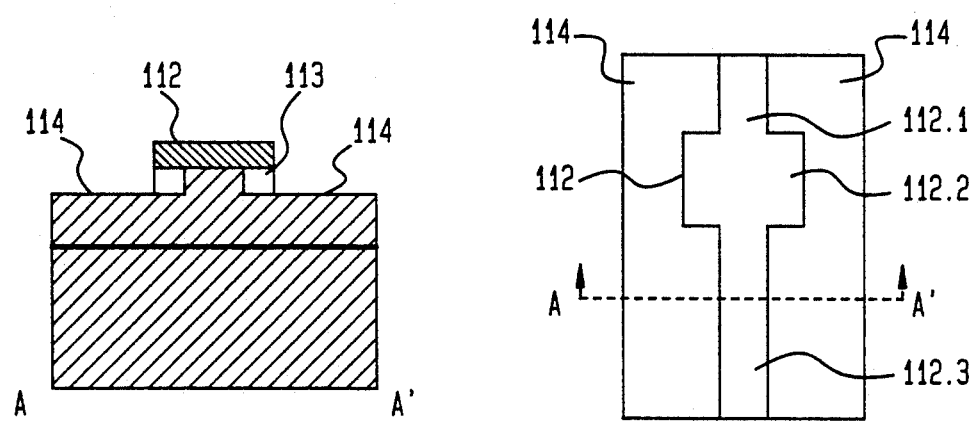

As illustrated in FIG. 11A, the process is initiated starting from the layered AlGaAs/GaAs laser structure 110. For simplicity and clarity reasons, of all layers in the stack only the active layer 111 is individually shown. After deposition of the different stack layers, the structure 110 has to be degreased and cleaned to prepare it for the process steps required for ridge and mirror facet fabrication. First, a positive resist is applied, exposed with the laser and waveguide ridge pattern and developed (using contact lithography and a Cr mask). One mask is used such that both waveguides, the laser waveguide and the external waveguide, are lateraly aligned. The patterned photoresists 112, with a narrow section 112.1 a widened section 112.2 and another narrow section 112.3, then serves as a mask in a wet etch step (in a solution $H_2SO_4/H_2O_2/H_2O$) to form the ridge 113 having the same shape as the patterned photoresist 112. The etched surface areas are designated 114 (FIG. 11B). Typical dimensions for a single-mode waveguide are a ridge height of 1.5 $\mu m$, a ridge width of 3 $\mu m$, and a ridge (or laser cavity) length of 200 to 1000 $\mu m$. The widened waveguide end of the laser shown in FIGS. 7 and 8, are about 8 $\mu m$ wide and should, after mirror etching, be about 2 $\mu m$ long.

Figure 11C:
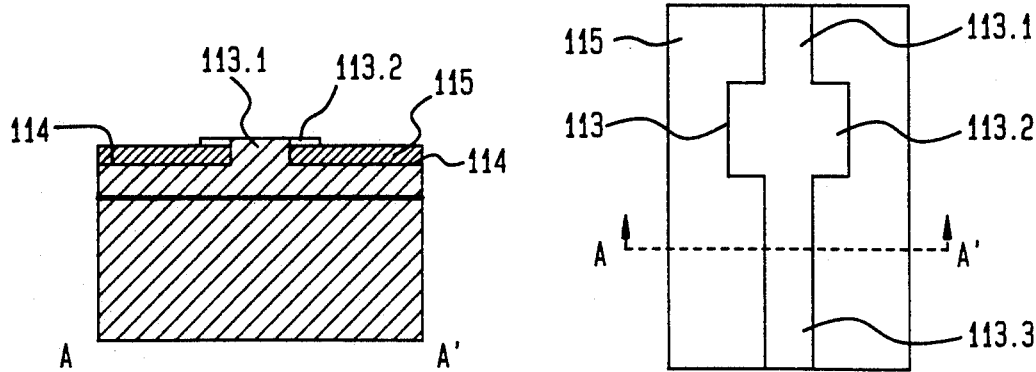
Figure 11D:
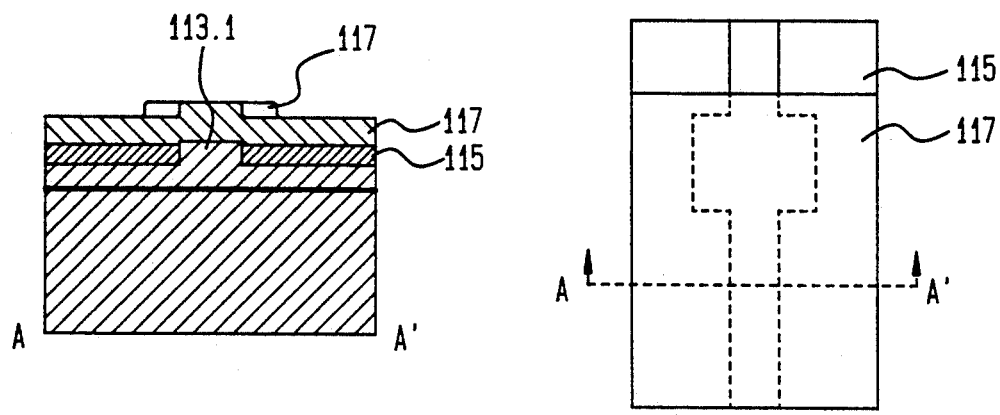
Figure 11E:
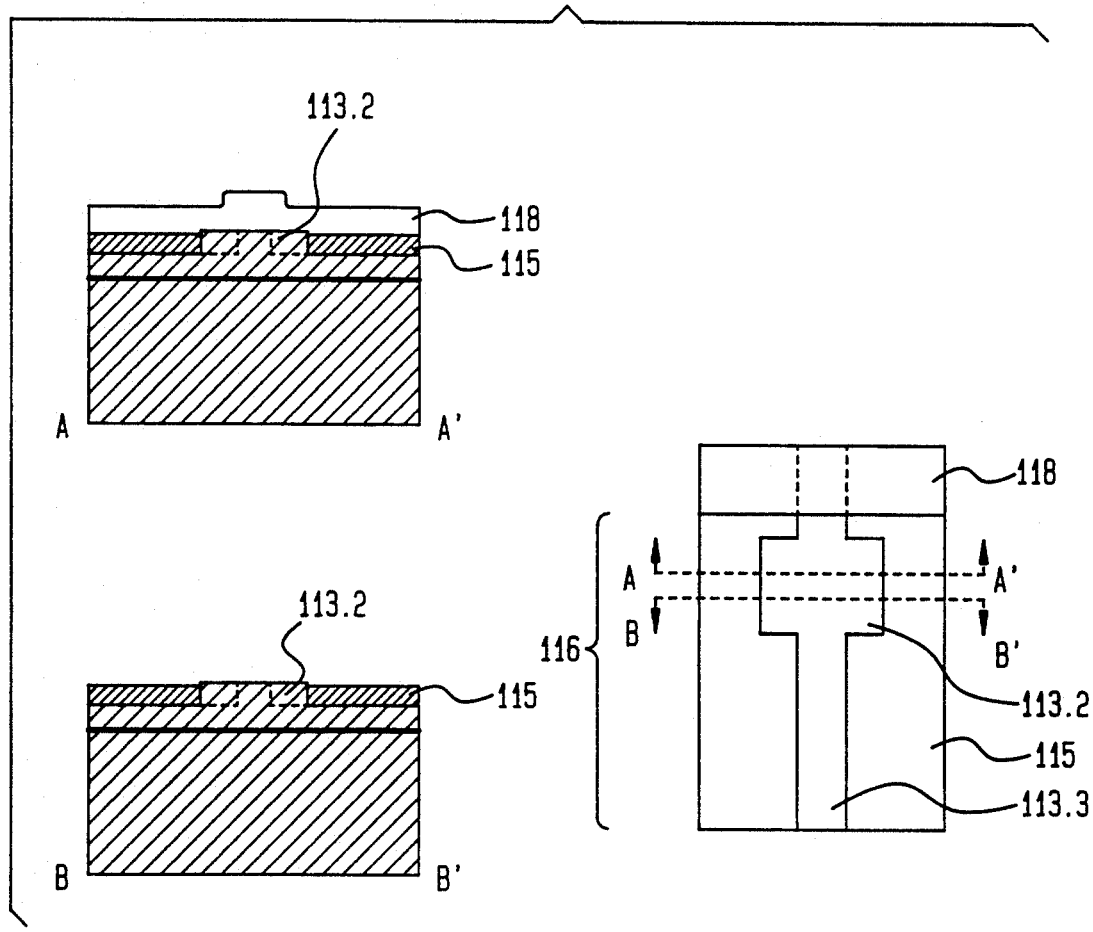
Figure 11F:
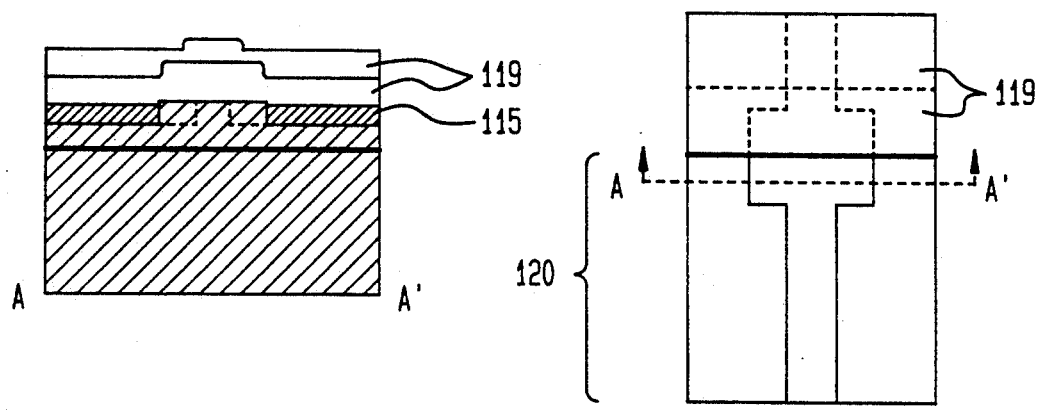

Subsequently, a $Si_3N_4$ insulation layer 115 of 200 nm thickness is deposited, using a plasma enhanced chemical vapor deposition (PECVD) process, thereby embedding both, the ridge 113 covered by the patterned photoresist mask 112, and the etched surfaces 114. The resist 112 is then lifted-off (in Aceton) leaving a self-aligned unisolated contact stripe on top of the laser ridge 113, whereas the etched surfaces 114 remain covered by the $Si_3N_4$ insulation layer 115 (FIG. 11C). Next, a multi layer resist structure is deposited and structured (using a reactive ion etch (RIE) process with $O_2$) to serve as a lift-off mask 117 for the definition of the top (p-) contact pad of the laser. The mask ends about 2 $\mu m$ from the widened ridge end section 113.2 as shown in FIG. 11D and covers the ridge 113 and the insulation layer 115. Then, a TiPtAu film is deposited, followed by lift-off resulting in the top contact 118 extending over the length of the laser ridge 113.1 but ending about 2 $\mu m$ in front of the widened ridge end section 113.2, thereby leaving a window 116 for the etching of the mirror groove (FIG. 11E).

In a next step, or sequence of steps, a mask 119 for etching the mirror groove is formed. A single layer mask may be used but a multi-layer structure is preferred because it provides for smoother vertical mirror facets. Such a multi-layer etch mask and its use in the fabrication of opto-electronic semiconductor structures is described in the European Patent application with publication No. 0 363 547. The mask includes two photoresist layers, a hard-baked bottom layer and a soft baked top layer, with a thin amorphous dielectric intermediate layer sandwitched there between. The etch pattern, lithographically formed in the top resist layer, is successively transferred, first into the intermediate layer and then into the bottom hard-baked resist layer, the latter serving as actual mask 119 during the subsequent mirror groove etch process. It is patterned to expose the underlaying semiconductor structure area 120.

Figure 11G:
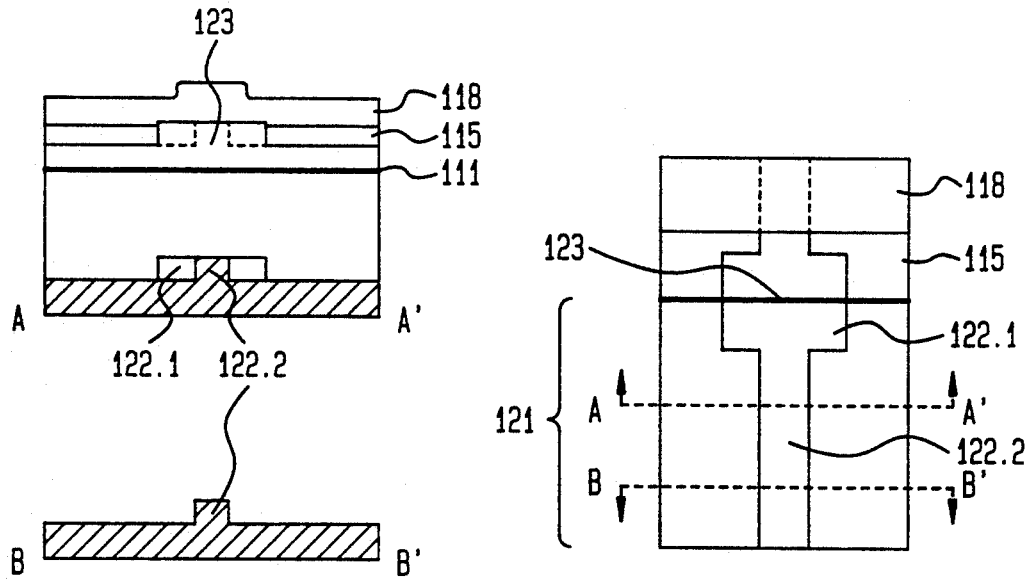

For mirror groove etching and transfer of the ridge structure into the substrate, a $Cl_2$/Ar-CAIBE process is used with an Argon energy of 500 eV and a $Cl_2$ flow of 15 sccm through a feed ring, the sample rotating at a room temperature for 15 minutes. For high laser beam quality and efficient reflection of light, which requires smooth, vertical and residue-free facets, this etching process must provide a high degree of anisotropy, high mask selectivity and low surface damage. Further details about the etching process for high quality laser mirrors are described in the articles "Chemically Assisted Ion Beam Etching Process for High Quality Laser Mirrors", of P. Buchmann et al., Microelectronic Engineering 9, 1989, pp. 485–489, and "Full Wafer Technology—A new Approach to Large-Scale Laser Fabrication and Integration", of P. Vettiger et al., IEEE Journal of Quantum Electronics, Vol. 27, No. 6, June. 1991, p. 1319. After etching, the hard-baked resist 119 is removed by ashing in an $O_2$ plasma. This is followed by cleaning in solvents (FIG. 11G). This intermediate state during the fabrication of a similar ridge laser with self-aligned waveguide is shown in FIG. 7.

Figure 11H:
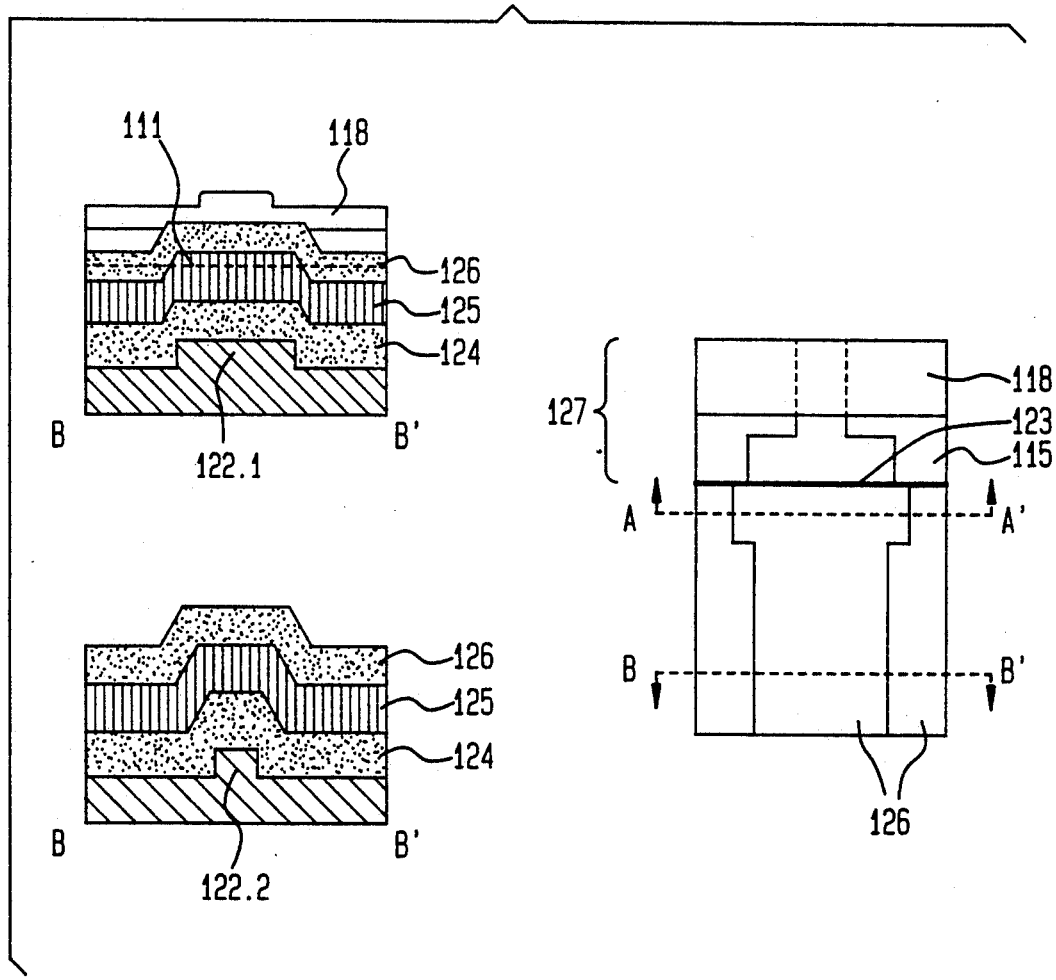

The resulting mirror groove 121 with transferred ridge structure 122.1 and 122.2, providing the mirror facet 123, has a depth of 4 up to 6 $\mu m$ and the facets have a roughness of less than 20 nm by the employment of the flared end-section. In the next steps, the waveguide layers are deposited on top of the transferred ridge structure 122.1, 122.2 and the mirror groove 121 (FIG. 11H). In this specific embodiment, the waveguide is built by a blanket deposition of different dielectric layers 124–126 of non-linear or optically active materials, for example $SiO_2$ and $Si_3N_4$. The sequence of the deposited layers 124–126 and their thickness and dielectric constants form the vertical optical guiding structure. During the deposition of the waveguide layers 124–126, the laser part 127 of the structure is covered by a mask. For the deposition of the waveguide a directional deposition technique is preferred because this allows to maintain the waveguide layer geometry without disturbance very close to the laser mirror facet 123. The deposition of the waveguide layers has to be precisely controlled to adjust the waveguide core 125 to the active layer 111 of the laser. Measurements of the exact position of the light mode region at the laser facet can be made prior to the deposition of the waveguide layers to determine their thickness and to further improve the coupling efficiency.

These steps for the fabrication of the inventive structure are simplified and the corresponding Figures are schematic views of intermediate steps during the fabrication. Several modifications of the process steps as described are possible. The device shown in FIGS. 5 and 6, for example, does not require the widened end sections.

These two embodiments of the present invention may be used in different structures as hereinafter described. Several suitable materials are known which can be used in these structures. Prerequisites are that the difference between the refractive indices of the waveguide cladding layer and the waveguide core on one hand and the difference between the indices of the laser waveguide and its cladding layer have to be nearly equal. These differences are called refractive index steps. This results in homogeneous and most efficient coupling of light from the laser waveguide to the external waveguide. The mode cross-section of the waveguide is by matched refractive index steps the same as in the laser. In addition the waveguide has to be transparent for the wavelength $\lambda$ of the laser.

Figure 12:
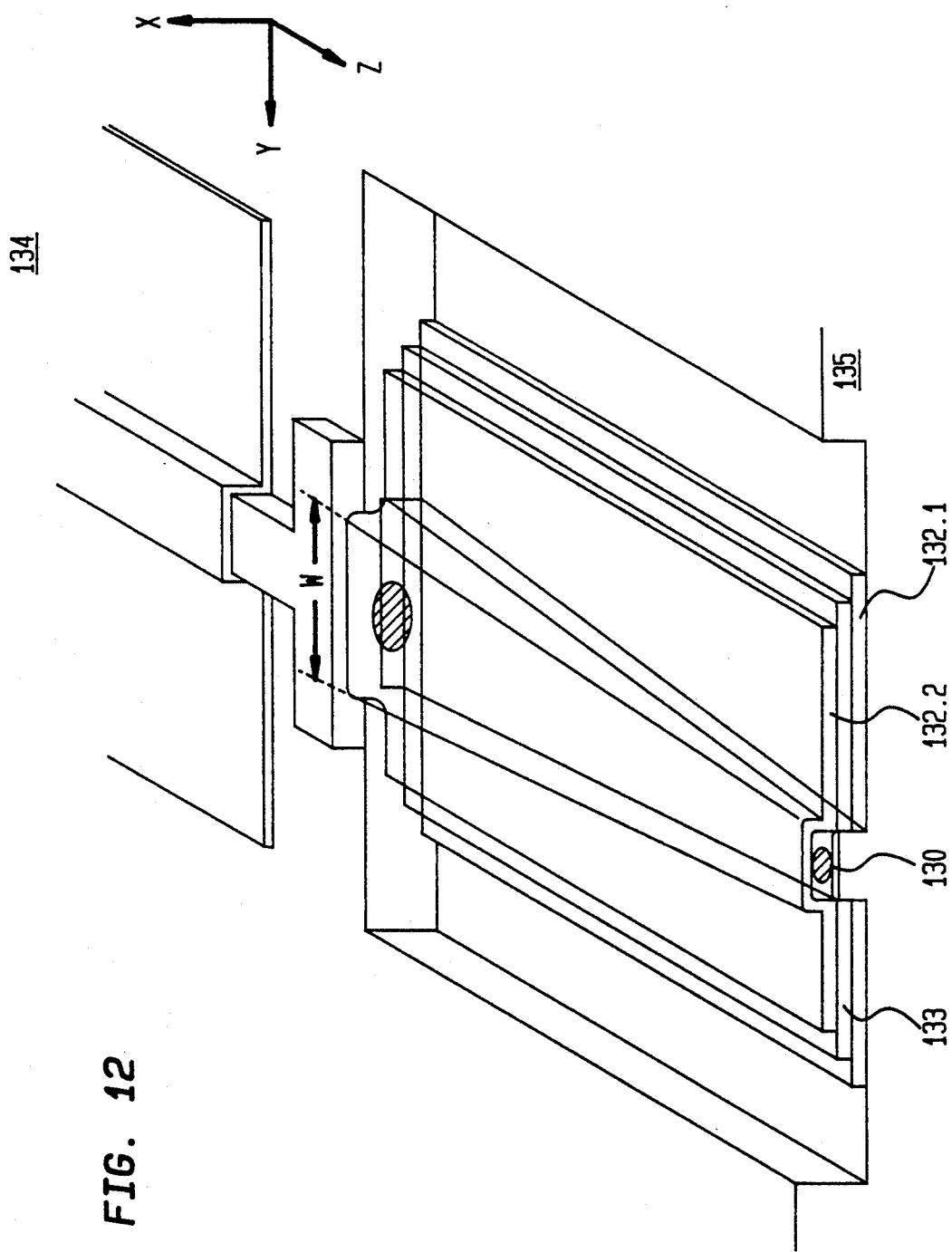
FIG. 12 is a perspective view of a ridge laser having a flared end section and being coupled to an external tapered waveguide, this waveguide being grown on top of a ridge structure transferred into the substrate.

One example where to use the method for self-aligned waveguide to laser coupling is described with reference to FIG. 12. This Figure shows a tapered waveguide consisting of cladding layers 132.1, 132.2 and a waveguide core 133. These layers are deposited on top of the device substrate 135 to which the ridge structure of the laser 134 is transferred during the mirror etch step. The lateral width w, being a function of z, of this waveguide core 133 is reduced to its thickness, thus producing an optical mode pattern 130 with a modified aspect ratio. An aspect ratio of approximately 1:1 (x:y) can be achieved by the employment of a tapered waveguide. The external waveguide grown on the transferred ridge structure is aligned and coupled to the flared end-section 131 of the laser ridge. By the efficient and well aligned coupling to a tapered waveguide shown in FIG. 12 beam shaping of the laser beam is possible. The tapered waveguide coupled to a laser allows elimination the costly and bulky beam-circularizer used in optical storage systems. The storage density of an optical storage can be reduced by changing the cross-section of the laser beam from oval to circular.

Further applications of the self-aligned coupling method in combination with a tapered external waveguide are conceivable. A tapered external waveguide well aligned and efficiently coupled to a laser can be used as interconnection medium between a ridge laser diode with oval light mode region at the laser mirror and an external optical fiber of circular cross-section. This interconnection medium improves the coupling efficiency and simplifies the cost of production and packaging.

Figure 13A:
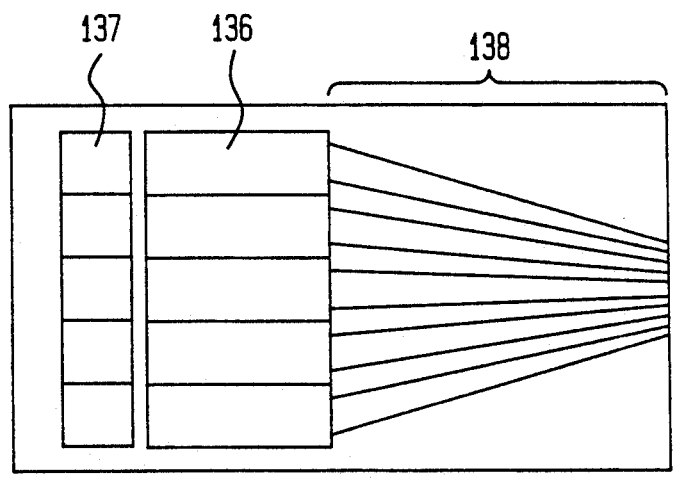
FIG. 13A is a schematic top view of a laser array coupled to a tapered waveguide bundle and being monitored by backside facet photodiodes.
Figure 13B:
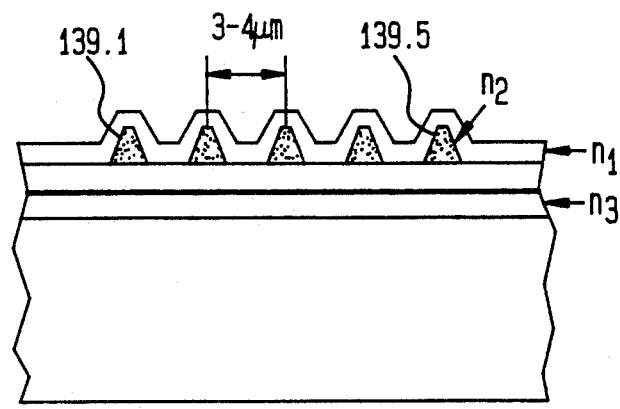
FIG. 13B shows the end facet of the device in FIG. 13A with the light output areas of the waveguide bundle.

Another example is illustrated in FIG. 13. The Figure shows a laser array 136 being coupled to an array of tapered external waveguides 138. This configuration allows generation of a densely spaced array of beam exit facets 139.1–139.5 which is not obtainable with closely spaced lasers due to the minimum electrode width required for current conduction. As can be seen in FIG. 13A, monitor diodes 137 are coupled to the backside of the laser array 136 to control its operation. The distance between the single exit facets of the waveguide array 138 is about a few microns, depending on the transferred ridge structure and chosen layer thickness.

Other applications where the inventive method can be used are mode-locked semiconductor lasers for generating short light pulses. This kind of device usually comprises a gain section, a low loss waveguide, and a saturable absorber section. A hybrid mode-locked quantum well laser is disclosed in the article "Picosecond Pulses (2ps) from Hybrid Mode-Locked AlGaAs QW Lasers with integrated Active Waveguide Cavities", of L. R. Brovelli et al., Electronics Letters, Vol. 27, No. 12, Jun. 6, 1991, pp. 1104–1106. This device generates laser pulses down to 2 ps ($2 \cdot 10^{-12}$ s) and can be further improved using the inventive method by efficiently coupling one side of the low loss section to the gain section and the other side to the saturable absorber. The reflectivity between laser/waveguide and absorber/waveguide has to be very small such that the etched mirror surface of the gain region has to be coated with an anti-reflection coating before depositing the waveguide layers on the transferred ridge structure.

The above-described method for efficient laser to diode or laser to fiber coupling is of fundamental importance for future opto-electronic integrated circuits (OEIC) and is a further step towards full wafer processing.

What is claimed is:

1. An electro-optical device, comprising:
   a substrate;
   a laser grown on said substrate, and having an active region, an etched mirror, and a laser ridge thereon, wherein the shape of the laser ridge is transferred to said substrate so as to form a substrate ridge, said laser generating a beam; and
   an optical waveguide coupled to the mirror, and being deposited on said substrate ridge so as to be laterally aligned by said substrate ridge to said laser ridge, said optical waveguide effectively shaping the beam generated by said laser said optical waveguide comprising a lower cladding layer grown on top of said substrate ridge, a waveguide core disposed on top of said lower cladding layer, and an upper cladding layer disposed on top of said waveguide core, wherein said cladding layers and said waveguide core comprise material having refractive indices which match the refractive indices of said laser, wherein said upper and lower cladding layers have approximately the same refractive indices, and wherein the difference between the refractive index of the waveguide core and the refractive index of said upper cladding layer is equal to the difference between the refractive indices of the active layer of said laser and the upper cladding layer, respectively.

2. An electro-optical device according to claim 1, wherein the optical waveguide has a widened end-section.

3. An electro-optical device according to claim 2, wherein said laser and said substrate have ridges with widened end-sections, and wherein the optical waveguide is deposited on top of said substrate.

4. An electro-optical device according to claim 1, wherein said optical waveguide is tapered towards one end.

5. An electro-optical device according to claim 4, wherein said tapered optical waveguide changes the cross-section of the beam generated by said laser from oval to circular.

6. An electro-optical device according to claim 1, wherein said optical waveguide changes the cross-section of the beam generated by said laser from oval to circular.

7. An electro-optical device, comprising:
   a substrate;

a laser grown on said substrate, and having a GaAs active region embedded between two cladding layers comprising AlGaAs, an etched mirror, and a ridge thereon, wherein the shape of the laser ridge is transferred to said substrate so as to form a substrate ridge, said layer generating a beam; and an optical waveguide coupled to the mirror, and having a $Si_3N_4$:H core aligned to the active region, said $Si_3N_4$:H core being embedded between $SiO_2$ cladding layers, and said optical waveguide being deposited on said substrate ridge so that said optical waveguide is laterally aligned by said substrate ridge to said laser ridge, wherein said opical waveguide effectively shapes the beam generated by said laser.

* * * * *